(12) United States Patent
Yang et al.

(10) Patent No.: US 10,489,703 B2
(45) Date of Patent: Nov. 26, 2019

(54) MEMORY EFFICIENCY FOR CONVOLUTIONAL NEURAL NETWORKS OPERATING ON GRAPHICS PROCESSING UNITS

(71) Applicant: NEC Laboratories America, Inc., Princeton, NJ (US)

(72) Inventors: Yi Yang, Plainsboro, NJ (US); Chao Li, Raleigh, NC (US); Min Feng, Princeton, NJ (US); Srimat Chakradhar, Manalapan, NJ (US)

(73) Assignee: NEC Corporation (JP)

( * ) Notice: Subject to any disclaimer, the term of this patent is extended or adjusted under 35 U.S.C. 154(b) by 779 days.

(21) Appl. No.: 15/161,080

(22) Filed: May 20, 2016

(65) Prior Publication Data
US 2016/0342888 A1 Nov. 24, 2016

Related U.S. Application Data

(60) Provisional application No. 62/164,398, filed on May 20, 2015.

(51) Int. Cl.
G06N 3/04 (2006.01)
(52) U.S. Cl.
CPC .................. *G06N 3/0454* (2013.01)
(58) Field of Classification Search
CPC .............................................. G06N 3/02–049
USPC ..................................................... 706/15–44
See application file for complete search history.

(56) References Cited

U.S. PATENT DOCUMENTS

2016/0104056 A1* 4/2016 He ....................... G06K 9/4609
382/158
2016/0239706 A1* 8/2016 Dijkman ............ G06K 9/00503

OTHER PUBLICATIONS

Scherer et al. "Accelerating Large-Scale Convolutional Neural Networks with Parallel Graphics Multiprocessors", 2010, 20th International Conference on Artificial Neural Networks.*
Strigel et al. "Performance and Scalability of GPU-based Convolutional Neural Networks", 2010, 18th Euromicro Conference on Parallel, Distributed and Network-based Processing.*
(Continued)

*Primary Examiner* — Jue Louie
(74) *Attorney, Agent, or Firm* — Joseph Kolodka

(57) ABSTRACT

Aspects of the present disclosure are directed to techniques that improve performance of CNN systems through the effect of improved memory efficiencies for CNNs operating on GPUs. Aspects of the disclosure demonstrate that off-chip memory in such CNN systems is underutilized due to at least three characteristics namely, data layout, data locality and inter-kernel redundancy. Aspects of the disclosure examine the performance impact of different data layouts and then describe a method to produce data layout selection for various layers of the CNN including a fast transformation implementation. Disclosed are improvements to data locality from working set expansion, elimination of inter-kernel redundancy and increase of TLP using kernel reconstruction techniques including kernel fusion and thread injection. Disclosed experimental results show that our optimizations are very effective to boost the performance of CNNs by amounts up to 9.76 times for a single kernel and 2.05 times for a network.

1 Claim, 19 Drawing Sheets

(56) References Cited

OTHER PUBLICATIONS

Wang et al. "Kernel Fusion: an Effective Method for Better Power Efficiency on Multithreaded GPU", 2010, IEEE/ACM International Conference on Green Computing and Communications.*
Collobert et al. "Implementing Neural Networks Efficiently", 2012, (Implementing Neural Networks Efficiently, Lecture Notes in Computer Science, vol. 7700.*
Peeman et al. "Memory-Centric Accelerator Design for Convolutional Neural Networks", 2013, IEEE 31st International Conference on Computer Design (ICCD).*
Chetlur et al. "cuDNN: Efficient Primitives for Deep Learning", Dec. 2014, ArXiv.org.*
Chen et al. "DianNao: A Small-Footprint High-Throughput Accelerator for Ubiquitous Machine-Learning", Mar. 2014, Proceedings of the 19th international conference on Architectural support for programming languages and operating systems.*
Alex Krizhevsky, "One weird trick for parallelizing convolutional neural networks", Apr. 2014, ArXiv.org.*

* cited by examiner

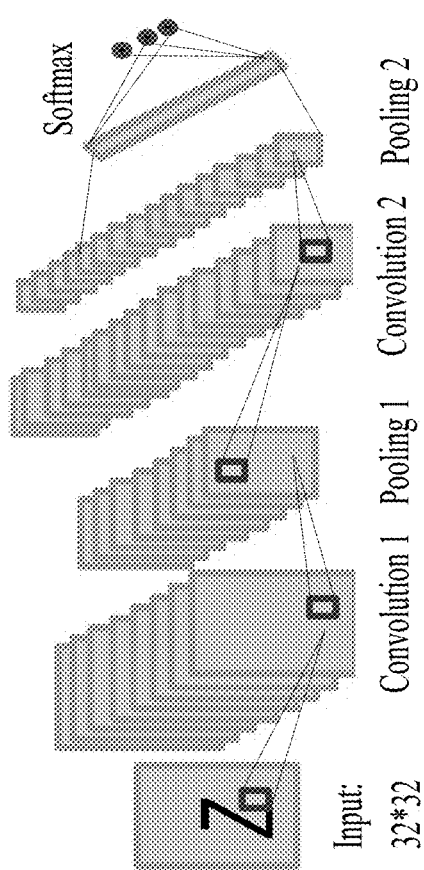

```
#define MAX(a,b) ((a)>(b))?(a):(b)
#define SUM(a,b) ((a)+(b))
for(i=0;i<num_img;i++)
    for(j=0;j<num_category;j++)
        max_vec[i] = MAX(mat1[i][j],max_vec[i]);
for(i=0;i<num_img;i++)
    for(j=0;j<num_category;j++)
        mat1[i][j] = mat1[i][j] - max_vec[i];
for(i=0;i<num_img;i++)
    for(j=0;j<num_category;j++)
        mat2[i][j] = exp(mat2[i][j]);
for(i=0;i<num_img;i++)
    for(j=0;j<num_category;j++)
        sum_vec[i] = SUM(mat2[i][j],sum_vec[i]);
for(i=0;i<num_img;i++)
    for(j=0;j<num_category;j++)
        mat3[i][j] = mat2[i][j] / sum_vec[i];
```

FIGURE 2

```
1  __global__ void Transformation (float *in, float *out){
2  //from CHWN to NHWC.
3  int tx =threadIdx.x, bx= blockIdx.x;
4  int by =blockIdx.y, bz=blockIdx.z;
5  out[(((tx*gridDim.z+bz)*gridDim.y+by)*gridDim.x)+bx] =
6      in[(((bz*gridDim.y+by)*gridDim.x)+bx)*blockdDim.x+tx];}
```

*FIGURE 7(a)*

```
1  template <int N, int C>
2  __global__ void OptTransformation(float2 *in, float *out) {
3    int tx = threadIdx.x, ty = threadIdx.y, bx = blockIdx.x, by = blockIdx.y;
4    //Matrix flatten 4D to 2D: [C][H][W][N]->[C*H*W][N]
5    int D2_N = N/2;  int D2_H = gridDim.y*gridDim.x*blockDim.x;
6    //Shared Memory Tile for Subgroup Transpose
7    __shared__ float2 sh[C][33];  //Padding
8    for(int i=0; i< N/64; i++) { //handle 64 images very time
9      int m = by*gridDim.x*blockDim.y + bx*blockDim.y+ty;
10     //Subgrouping
11     int D3_H = m/32; int D3_W = m % 32;
12     int index = D3_W + D3_H*32;
13     sh[ty][tx] = in[index*D2_W+tx+i*32];
14     __syncthreads();
15     //Vector Transpose Index
16     if(C%32==0){
17       out[(2*ty+i*64)*D2_H+(bx)*32+tx] = sh[tx][ty].x;
18       out[(2*ty+1+i*64)*D2_H+(bx)*32+tx] = sh[tx][ty].y; }
19     else if(C%16==0){
20       out[(2*ty+i*64)*D2_H+bx*32+tx] = sh[tx][ty].x;
21       out[(2*ty+1+i*64)*D2_H+bx*32+tx] = sh[tx][ty].y;
22       out[(2*(ty+16)+i*64)*D2_H+bx*32+tx] = sh[tx][ty+16].x;
23       out[(2*(ty+16)+1+i*64)*D2_H+bx*32+tx] = sh[tx][ty+16].y;}
24     __syncthreads();    }//end loop
25  }//end kernel
```

*FIGURE 7(b)*

```
#define ThreadIdx()
{ tx = threadIdx.x;   ty = threadIdx.y;  \
  bx=blockIdx.x;   tidx =bx*blockdDim.x+tx;}

__global__ void softmax_final(float *in,
float * out, int num_img, int num_category){
ThreadIdx();
__shared__ float tile1_TB[64][16];
float mx = 0;
for(int i=0;i< num_category;i+=blockDim.y)
         mx = MAX(in[i*num_img+tidx],mx);
tile1_TB[ty][tx] = mx;
__syncthreads();
for (int k=32;k>0;k=k>>1){
    if(ty<k)
tile1_TB[ty][tx] = MAX(tile1_TB[ty][tx],tile1_TB[ty+k][tx]);
    __syncthreads(); } for(int i=ty;i<num_category;i+=blockDim.y)
         out[i*num_img+tidx] = __expf(
                  in[i*num_img+tidx]-tile1_TB[0][tx]);

float sum =0;
for(int i=ty;i<num_categeory;i+=blockDim.y)
         sum = SUM(out[i*num_img+tidx],sum);
tile1_TB[ty][tx] = sum;
__syncthreads();
for (int k=32;k>0;k=k>>1){
   if(ty<k)
tile1_TB[ty][tx] = MAX(tile1_TB[ty][tx],tile1_TB[ty+k][tx]);
     __syncthreads();} for(int i=ty;i<num_category;i+=blockDim.y)
         out[i*num_img+tidx] =
                  out[ii*num_img+tidx]/tile1_TB[0][tx];
}
```

FIGURE 10

MEMORY EFFICIENCY FOR CONVOLUTIONAL NEURAL NETWORKS OPERATING ON GRAPHICS PROCESSING UNITS

CROSS REFERENCE TO RELATED APPLICATIONS

This application claims the benefit of U.S. Provisional Patent Application Ser. No. 62/164,398 filed May 20, 2015 the entire contents of which are incorporated by reference as if set forth at length herein.

TECHNICAL FIELD

This disclosure relates generally to computational methods and systems. More particularly, this disclosure relates to methods and systems for improved memory efficiency for convolutional neural networks (CNN) operating on graphics processing units (GPU).

BACKGROUND

Computational Neural Networks (CNNs) have emerged as powerful tools when employed on large-scale learning problems. In particular, witness recent application of CNNs to important application domains including image recognition, speech recognition and facial recognition.

Contributing to the effective application of CNNs are large and powerful model(s) constructed from large-scale data set(s) and high performance computing platforms including general purpose graphics processing units (GPG-PUs) providing teraflop computational capabilities. Notwithstanding contemporary implementation success(es), bottlenecks remain with respect to implementing CNNs on GPUs.

In particular, one such bottleneck encountered when implementing CNNs on GPUs is a memory bandwidth that is stressed due to massive data fetching. Given the importance CNNs and their frequent implementation on GPUs, techniques, methods and structures that enhance their performance on such GPUs would represent a welcome addition to the art.

SUMMARY

An advance in the art is made according to the present disclosure which describes techniques for improving the performance of CNNs operating on GPUs wherein the techniques improve memory usage such that significant performance improvements result.

According to aspects of the present disclosure, significant performance enhancements of CNNs operating on a GPU are realized by generating layout transformation for data operated on by the CNN; enabling efficient utilization of on-chip memory resource(s) in the GPU such that data locality in a pooling layer of the CNN is exploited; and reducing any inter-kernel redundancy while increasing a number of threads employed through the effect of kernel fusion and thread injection.

Advantageously, and as will be shown and quantified, method(s) according to the present disclosure produce significant performance improvements in CNN operation on GPUs heretofore unknown in the art.

BRIEF DESCRIPTION OF THE DRAWING

A more complete understanding of the present disclosure may be realized by reference to the accompanying drawing in which:

FIG. 1 is a schematic diagram illustrating the prediction structure of an illustrative CNN example;

FIG. 2 is a listing showing an algorithm description for a softmax layer;

FIGS. 7(a) and 7(b) show listings of 7(a) native kernel, and 7(b) optimized kernel according to an aspect of the present disclosure;

FIG. 10 shows listings for an optimized kernel according to an aspect of the present disclosure;

Figure 3:
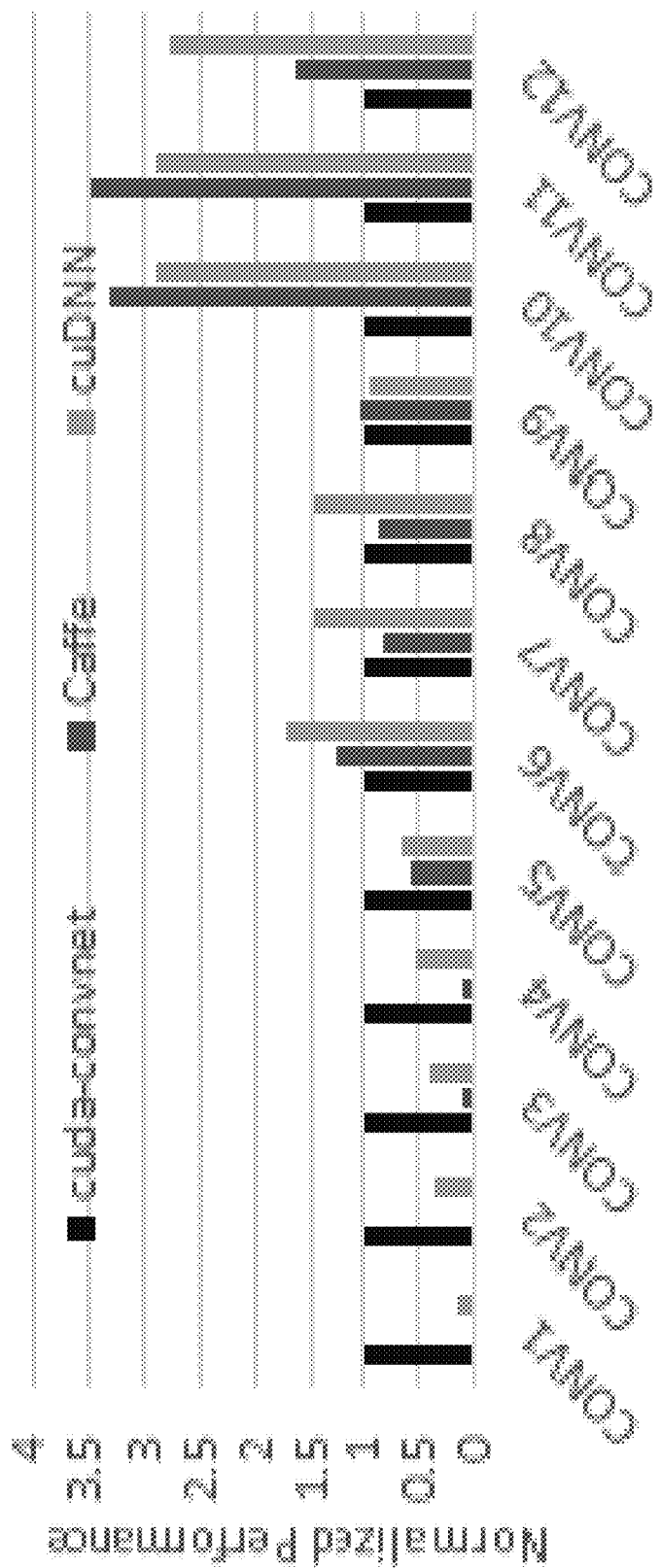
FIG. 3 is a graph illustrating performance comparison between two different data layouts across convolutional layers wherein all performance is normalized to cuda-convnet.

The illustrative embodiments are described more fully by the Figures and detailed description. Inventions according to this disclosure may, however, be embodied in various forms and are not limited to specific or illustrative embodiments described in the Figures and detailed description

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGURES are not drawn to scale.

We begin by noting that in an era of data explosion—data analysis and content understanding applications have been in great demand in industry. Notably, machine learning algorithms have been successfully used to extract latent features as well as to make predictions. One category these applications is deep learning, wherein a convolutional neural network (CNN) is oftentimes employed.

As is known by those skilled in the art, a CNN comprises a sequence of layers—the number of which have been increased such that better accuracies of results are realized. Consequently, CNNs tend to exhibit a deep hierarchy (i.e., deep CNN) which places great stress(es) on both computational power and memory bandwidth of any system(s) employing same. For instance, GoogleNet (See, e.g., C. Szegedy, W. Liu, Y. Jia, P. Sermanet, S. Reed, D. Anguelov, D. Erhan, V. Vanhoucke and A. Rabinovich, "Going deeper with convolutions," In CVPR, 2015) includes 22 layers wherein each layer has many thousands of parameters. As a result, a data set including 1.2 million images is used to train such a CNN (model).

In order to accelerate the CNN learning process, many-core architectures including GPUs have been employed in state-of-art CNN frameworks such as Caffe [See, e.g., Y. Jia, E. Shelhamer, J. Donahue, S. Karayev, J. Long, R. Girshick, S. Guadarrama and T. Darrell, "Caffe: convolutional architecture for fast feature embedding," CoRR, abs/1408.5093, 2014), cuda-convnet [See, e.g, A. Krizhevsky, "Cudaconvet2, 2014)—among others [See, e.g., R. Collobert, Koray Kavakcuoglu and C. Farabet, "Torch?: A Matlab-like environment for machine learning", in NIPSW 2011]. Of particular interest, it has been shown that the GPU-based implementation can achieve a performance improvement of 10 to 60 times over single instruction, multiple data (SIMD) central processing units (CPUs). Additionally, Nvidia has recently released a library—cuDNN—to accelerate a set of core CNN layers on GPUs.

As will be readily appreciated by those skilled in the art, a CNN contains a set of different types of layers. Among these layers, the convolutional layer, the pooling layer and the softmax layer are known to have significant impacts on the performance. And while much prior art has been focused on improving the performance of the convolutional layer by improved arithmetic logic unit (ALU) utilization on GPUs, the memory efficiency has been overlooked.

As we will describe, efficient utilization of memory bandwidth is essential to realize a high performance CNN. And while recent development of frameworks and libraries have enhanced memory bandwidth—especially for memory-intensive layers such as the pooling and softmax layers—they nevertheless remain infirmed due to at least three reasons namely, data layout, data locality and inter-kernel redundancy.

Notably—in a CNN—data are generally organized using four-dimensional arrays. As a result, there are 24 distinct possibilities for arranging one such array in memory. Since each dimension has different memory access patterns and input sizes may also affect the performance of different data layouts, the design of same remains a challenge to developers. The problem is further complicated as the CNN contains multiple types of layers, and the type of a layer may also affect a data layout design. Notwithstanding, we have observed that existing frameworks only employ one type of data layout for all kinds of layers. As a result, such a single general and uniform data layout will lead to memory inefficiency.

Additionally, GPUs—and in particular GPGPUs—rely heavily on on-chip resources including register file and shared memory to improve data locality and preserve off-chip memory bandwidth. Efficient utilization of such on-chip resources is a non-trivial problem for high-level application developers. In an attempt to avoid low-level code optimization difficulty, Caffe employs a structure wherein the convolutional layer is on top of Nvidia cuBLAS. Unfortunately, such a "BLAS-based" approach cannot be applied to many other layers.

Finally, a machine learning method—or algorithm—may require several steps to complete. A straightforward implementation of the algorithm may have several kernels due to the nature of the SIMD programming model when so implemented. While such an implementation is relatively easy to understand and maintain for those skilled in the art, it may nevertheless exhibit unsatisfactory or otherwise poor performance due to overhead of communications between kernels. As will be readily appreciated by those skilled in the art, the data layout associated with such applications has a direct impact on such issues.

As we shall now disclose, to address memory efficiency problems in CNNs, we first characterize a set of data layouts and study their performance sensitivities. We then derive a guide from heuristic experiences to identify optimal data layout(s) for different scenarios. Advantageously, a fast data layout transformation to support different data layouts. is described and implemented. Additionally, and according to the present disclosure, we describe a method to exploit data locality and enhance the data reuse by aggressively expanding on-chip working sets, which we show may significantly enhance effective bandwidth. Finally, we describe a kernel reconstruction technique that advantageously reduces off-chip memory accesses across kernels by replacing them with on-chip data accesses inside a single kernel. We then describe how to enable inner-loop parallelism in kernel(s) thereby further improving performance. Our experimental results then demonstrate that our methods according to the present disclosure significantly improve the performance on at least three key layers, and in turn improve the performance of an entire network.

Deep Learning Architecture

As will be readily understood by those skilled in the art, a Multi-Layer Perceptron (MLP) is a well-known, classical, artificial neural network that can model non-linear relationships between inputs and outputs. Further readily understood by those skilled in the art is that CNNs are derivatives of the MLP, and they (CNNs) are known to exhibit a deep structure including a number of hidden layers.

As is further known, a CNN includes at least two particular stages namely, a prediction (or process) stage and training stage. The prediction stage is a feed-forward network which infers a label from a given input while the training stage adjusts parameters of the CNN to improve its inference accuracy. Additionally, a training stage is known to be a backward path of the prediction stage using a back propagation algorithm.

In a CNN, algorithms applied to data comprise a number of layers, and these layers are executed in sequence. Among these layers, there are three major types of layers namely, the convolutional layer, the pooling layer and the softmax layer.

Turning now to FIG. 1, there it shows an illustrative CNN which contains two convolutional layers, two pool layers and one softmax layer. In this CNN shown, an image having size 32 by 32 is taken as input. The convolutional layers are applied to generate multiple channels, and the pooling layers are used to reduce the size of the image. Finally the softmax layer in the classifier step is used to generate the final prediction of this image. For example, if the input image is a letter, a CNN for text recognition can be used to automatically identity the letter.

With this Figure in mind, we may now discuss algorithm(s) characteristic of each layer.

Convolution Layer:

The convolutional layer is the core of a CNN. In a prediction stage, the input of this layer is a 2D image and each pixel of the image contains a set of input features or channels. This layer first conducts convolutions using a synapse matrix, and then applies activation functions (e.g., ReLU, sigmoid) to complete a non-linear transformation. The output of this layer is the 2D image with output channels. Since each image is 2D and each pixel of the image has a set of channels, each image is stored in memory using a 3D array.

In order to utilize the massive computation power provided by GPGPUs, CNN frameworks oftentimes process multiple images in a batch. In this way, the input of a convolutional layer includes multiple images as a 4D array. The algorithm in the prediction stage proceeds as follows in equation [1].

$$out[Ni][Co][Hi][Wi] = \sum_{Ci=0}^{C} \sum_{f_h=0}^{F_H} \sum_{F_w=0}^{F_w} in[Ni][Ci][Hi+f_h][Wi+f_w] * \text{filter}[Co][Ci][f_h][f_w] \quad [1]$$

Where in is the input array, filter is the weights/parameters of the layer and out is the output array. As shown in Equation [1], all three arrays are 4D arrays.

For the input array, in, the first dimension is the number of image, and following it are the number of input feature channels, the height and weight of each input image. For the synapse matrix, which is also a four-dimensional matrix, the first dimension is the number of output feature channels, the second dimension is the number of input feature channels, and the other are the size of the 2D convolution filter kernel. The output is also four-dimensional matrix. However as compared to the input, the second dimension is the number of the output channels instead of the number of the input channels.

Pooling Layer:

The pooling layer, also sometimes called sub-sampling, is a basic building block used to summarize the outputs of neighboring groups of neurons. In terms of images, the pooling layer can be used to extract the salient features in the image with a given window and a given stride. Specifically, the pooling function is achieved by sliding a pooling window across each feature channel, and summarize a desired feature (e.g., using average or max) in the pooling area. Note that as a training stage is the reverse process of the process stage and the data structure is the same, the data layout and locality on process stage can be applied between them. The example of an average pool layer can be defined as follows in Equation [2]:

$$out[Ni][Co][Hi][Wi] = (\Sigma_{X=0}^{X} \Sigma_{Y=0}^{Y} \text{ in } [Ni][Ci][Hi*stride+y][Wi*stride+x])/Y/X \quad [2]$$

In equation [2], an output pixel is achieved by computing an average on a small window/block of the input. The location of the input window depends on the stride value and the location of the output pixel. Another important parameter is the size of the windows defined as X and Y in the equation.

Softmax Layer:

The softmax layer is the final layer of a CNN. It is constructed to compute the final predication loss. It is not only a building block in the artificial neural network, but also has been widely utilized in various multiclass classification algorithms including multinomial logistic regression, linear discriminant analysis and naive hayes classifiers. The algorithm includes five steps, and each step contains two loops as shown in FIG. 2.

The input data is a 2D array whose first dimension is used to identity an image and whose second dimension is used to predict the possibility of the image in one category. In a first step, it finds the maximum possibility of each image, and then in the second step calculates the difference between each possibility and the maximum possibility. The third step applies an exponent operation on each possibility. In the fourth step, all possibilities of each image are summed up, and the summation is used to divide possibilities in the last step.

Deep Learning on GPGPUs

GPGPUs employ many-core architectures to achieve the high throughput. Each GPU contains multiple next generation streaming multiprocessors (SMXs) on Nvidia latest architecture, and each SMX has multiple sets of streaming processors (SPs). Each set of SPs execute in SIMD model. These threads sharing a same instruction and running on a set of SPs are called a warp. In Nvidia architecture, a warp contains 32 threads. Due the limited size of hardware cache on GPGPUs, threads with a warp need to access consecutive off-chip memory to achieve the high bandwidth. Such a requirement is also called coalesced memory access.

Another way to improve the bandwidth efficiency is through the us e of shared memory or register file to cache the data from off-chip memory. However, the sizes of shared memory and register file are also limited and therefore they must be employed carefully. Notably, the register file is private to each thread, and the shared memory can be shared by threads in a thread block.

To release the full potential of the massive computation power of a GPU, off-chip memory accesses need to be performed in a deliberate manner. At this point, we summarize the challenges of efficiently accessing off-chip memory as follows.

First, as we have discovered, data layout has a significant impact on GPU memory bandwidth. Using matrix-vector multiplication (MV) as example, we have two data layouts to store an input matrix. One layout is a column-major format and the other layout is a row-major format. As may be appreciated, each output pixel of MV results from a product of a row of the input matrix and the vector, while a straightforward implementation of MV allows one thread to compute one output pixel. Therefore, if we are employing the row-major format, each thread needs to access a number of consecutive pixels in memory, and different threads in a warp will access different rows without satisfying coalesced memory requirement(s). As a result, the resulting memory bandwidth—when the row-major data layout is employed— is only 22.45 GB/S on a GTX Titan black whose peak memory bandwidth is 288 GB/S if the input matrix is 16 k by 16 k.

If—on the other hand—we employ the column-major data layout, the resulting memory bandwidth is 234 GB/S as threads in a warp access data in a coalesced manner and these data are in a same cache line. As will be appreciated and as we have now learned, an improved data layout may produce a 10× (ten-times) performance improvement.

However—and as will now be readily appreciated by those skilled in the art—selecting a best data layout for an application is not a trivial problem—especially for the deep learning algorithm which uses four-dimensional arrays. As may be observed in Equation (1), four dimensions are used to identify the Number of images, the feature Channels, the Height, and the Width. Note that the nomenclature used in Equation (1) uses abbreviations for each dimension using its first capital letter. Therefore, the data layout in Equation (1) is NCHW for the arrays, in and out. For such a four-dimensional array, there are overall 24 (i.e., 4!) data layouts. If we consider that different layers can have different data layouts, the number of choices can easily reach thousands. Therefore, the selection of data layout is a challenge for developers. Note that existing frameworks choose to use a fixed data layout. For example, cuda-convnet uses CHWN, while Caffe and cuDNN use NCHW.

Additionally,—in some cases—a data layout has been specified and is not a changeable option for developers. In such cases, developers have to apply optimizations to overcome any potential limitations of the data layout. For example, MV in Nvidia cuBLAS can achieve a memory bandwidth of more than 200 GB/s even with the row-major data layout. The reason is that Nvidia cuBLAS employs the on-chip memory resources to optimize the off-chip memory bandwidth. Such data locality optimization is critical to GPGPU programs. Unfortunately, our results show that most of deep learning frameworks utilize the off-chip memory in an inefficient way due—at least in part—to the lack of data locality optimizations.

Finally, GPGPU employs find-grain thread-level parallelism to achieve high performance wherein the execution program unit is a kernel. An algorithm may have to be decoupled into multiple kernels due to the different parallelism granularities. However, the communication between two kernels has to go through the off-chip memory accesses which are—of course—very costly. As a result, a multiple-kernel implementation for an algorithm may perform poorly due—in part—to inter-kernel redundancy although it is easier to understand and implement. We also observe the inner-loop parallelization is important for GPGPU programs due to the high number of cores of a GPU.

Experimental Methodology

We now discuss our experimental methodology before our characterizations and optimizations for deep learning applications. Since deep learning frameworks—i.e., Caffe, cuda-convnet and cuDNN have been commonly used and specifically optimized for GPGPUs, we describe memory efficiency on three major layers including the convolutional layer, t h e pooling layer and t h e softmax layer while employing these frameworks/library.

Note that Caffe selects NCHW data layout and implements the convolutional layer on top of cuBLAS, and cuda-convnet, uses CHWN as its data layout. It develops version 1 for Fermi GPUs, and version 2 for Kepler GPUs to achieve the best. In this paper cuda-convnet2 is used in our experiments. Nvidia cuDNN provides a set of layer functions as a library. We use the latest version of cuDNN 6.5 V2 which is released in March 2015 and supports NCHW data layout across all the three layers, and NHWC only in the convolutional layer.

Our measurements were performed on a GTX TITAN black exhibiting 288 GB/s theoretical memory bandwidth (and 235 GB/s effective bandwidth measure) and 5.1 Tflops/s computation power. We studied the memory efficiency problems using layers from five networks most representative including MNIST, CIFAR, Alexnet, Zeiler and VGG. The sizes of these networks are from small to large-scale. Table 1 shows the configurations for the benchmarking layers of the five networks. With reference to that table, from the left to right, for a convolutional layer it shows the number of images (Ni), the number of output feature channels (Co), the height/width of each image (H/W), width/ height of each kernel filter (Fw IFh), the number of input feature channels (C9), and the stride (S).

TABLE 1

| Layer | Ni | Co | H/W | Fw/Fh | Ci | S | Description |
|---|---|---|---|---|---|---|---|
| CONV1 | 128 | 16 | 28 | 5 | 1 | 1 | Mnist dataset: |
| CONV1 | 128 | 16 | 14 | 5 | 16 | 1 | Model Error rate: |
| POOL1 | 128 | — | 28 | 2 | 16 | 2 | 0.18% (epoch |
| POOL2 | 128 | — | 14 | 2 | 16 | 2 | 200) |
| CLASS1 | 128 IMAGES AND 10 CATEGORIES | | | | | | |
| CONV3 | 128 | 64 | 24 | 5 | 3 | 1 | Cifar10 dataset: |
| CONV4 | 128 | 64 | 12 | 5 | 64 | 1 | Model Error |
| POOL3* | 128 | — | 24 | 3 | 64 | 2 | rate: 14.04% |
| POOL4* | 128 | — | 12 | 3 | 64 | 2 | (epoch 100) |
| CLASS2 | 128 IMAGES AND 10 CATEGORIES | | | | | | |
| POOL5* | 128 | — | 55 | 3 | 96 | 2 | ImageNet with |
| POOL6* | 128 | — | 27 | 3 | 192 | 2 | Alexnet Model |
| POOL7* | 128 | — | 13 | 3 | 256 | 2 | |
| CLASS3 | 128 IMAGES AND 1000 CATEGORIES | | | | | | |
| CONV5 | 64 | 96 | 224 | 3 | 3 | 2 | ImageNet with |
| CONV6 | 64 | 256 | 55 | 5 | 96 | 2 | Zeiler Model |
| CONV7 | 64 | 384 | 13 | 3 | 256 | 1 | (Champion of |
| CONV8 | 64 | 384 | 13 | 3 | 384 | 1 | ILSVRC 2013) |
| POOL8* | 64 | — | 110 | 3 | 96 | 2 | |
| POOL9* | 64 | — | 26 | 3 | 256 | 2 | |
| POOL10* | 64 | — | 13 | 3 | 256 | 2 | |
| CLASS4 | 64 IMAGES AND 1000 CATEGORIES | | | | | | |
| CONV9 | 32 | 64 | 224 | 3 | 3 | 1 | ImageNet with |
| CONV10 | 32 | 256 | 56 | 3 | 128 | 1 | VGG Model |
| CONV11 | 32 | 512 | 28 | 3 | 256 | 1 | ($2^{nd}$ Place of |
| CONV12 | 32 | 512 | 14 | 3 | 512 | 1 | ILSVRC 2014) |
| CLASS5 | 32 IMAGES AND 1000 CATEGORIES | | | | | | |

For a pooling layer, the width/height of the pool window is shown in table 1 as the width/height of each kernel filter. The softmax layer has two parameters including the number of images and the number of categories. We select the representative pooling layers including non-overlapped pooling and many overlapped pooling in the different networks. For the overlapped pooling, data locality optimizations are evaluated. To be equally compared, the bandwidth is computed by applying the same off-chip memory transfer on the times achieved with various implementation versions (e.g., in softmax, cuda-convnet is used as the baseline to compute the amount of bytes).

Data Layout: Characterization and Optimization

In this section we now discuss data layouts used in CNNs and characterize their performance sensitivities. Based on our observations, we describe a heuristic approach to choose an efficient data layout for a given input and a fast multi-dimensional data layout transformation.

Characterization of the Data Layout on Convolutional Layers

As noted previously and shown in Equation (1), the convolutional layer uses four-dimensional arrays, which can be organized in memory 24 different ways by mutating the orders of dimensions. As discussed previously, the names of these four dimensions can be simplified as N (the number of images), C (the number of feature channels), H (the height of each image), and W (the width of each image).

From Table 1 we can observations certain properties of each dimension. First, the value of N as a batch size—in general—is a multiple of 16, and has limited choices. Therefore, using N as the lowest dimension—which is consecutive in the memory—is a good choice to meet any coalesced memory accesses. Furthermore, from that Table 1, we can see 32, 64 and 128 are used and it is constant for layers of a network. Therefore, it has limited optimization spaces for different inputs.

Second, the width and height of each image typically exhibit the same value (i.e. a square window on local receptive fields), but the values can be very different. Since W and H have a strong connection, developers tend to put H on the left of W.

Third, the value of C is 1 or 3 for first convolutional layers of networks and is a multiple of 16 for the remainder of any convolutional layers. Due—in part—to the exception of first convolutional layers, it is more difficult to be used as the lowest dimension compared with N.

Based on these observations and the above discussion, W and H can be combined into a HW in the data layout and using N as the lowest dimension is a potential good data layout. In this way we are left with two choices: CHWN and HWCN. Note that in cuda-convnet CHWN is employed. A test of CHWN shows that it exhibits the same performance in cuda-convnet. This is due to the fact that it doesn't change memory coalescing for N dimension and keeps the data reuse on the rest of the dimensions.

As we have discovered, the use of the lowest dimension is more important than the other dimensions as it directly impacts how adjacent memory space aligns—which in turn determines the memory behavior. In order to meet coalesced memory accesses, using N as the lowest dimension requires threads in a warp to process different images. Additionally, since Caffe implements convolutional layers based on Nvidia cuBLAS, it puts HW in the lowest dimension and therefore NCHW is used in Caffe. Nvidia cuDNN uses NCHW as well, and is supposed to support a different data layout (e.g. CHWN) in the future. Due the variety of the value of C, none of existing frameworks/libraries prefer using Cas the lowest dimension. Since cuda-convnet, Caffe and cuDNN are highly optimized and have been used widely by developers, we describe our study as to how data layout impacts their implementations. Caffe also uses cuDNN in its implementation as an improved version, and therefore the main comparison is between CHWN (cuda-convnet) and NCHW (cuDNN).

As shown in FIG. 3, cuda-convnet outperforms Caffe and cuDNN in first five layers and the ninth layers (i.e., CONV9), and then performs worse in the remaining six layers. The difference between these two sets of layers is due to the N and C dimensions in the layer. First, among the six layers that performed better by cuda-convnet, CONV1, CONV3, CONV5 and CONV9 are the first layer of a network, and the value of C of these layers are 3 or 1. The layers, CONV2, CONV4 also have a small value of C—no more than 64. For the remaining layers, they were performed better by cuDNN, wherein the values of N are either 64 or 32. To further identity the sensitivities of data layouts on each dimension, we collect results with one varied dimension (N or C) and three fixed dimensions. (cuDNNv2 introduces NHWC data format, but the test shows that the NHWC format outperforms NHWC across the board (e.g. Vgg with 1.26× speedup on NCHW).

Figure 4A:
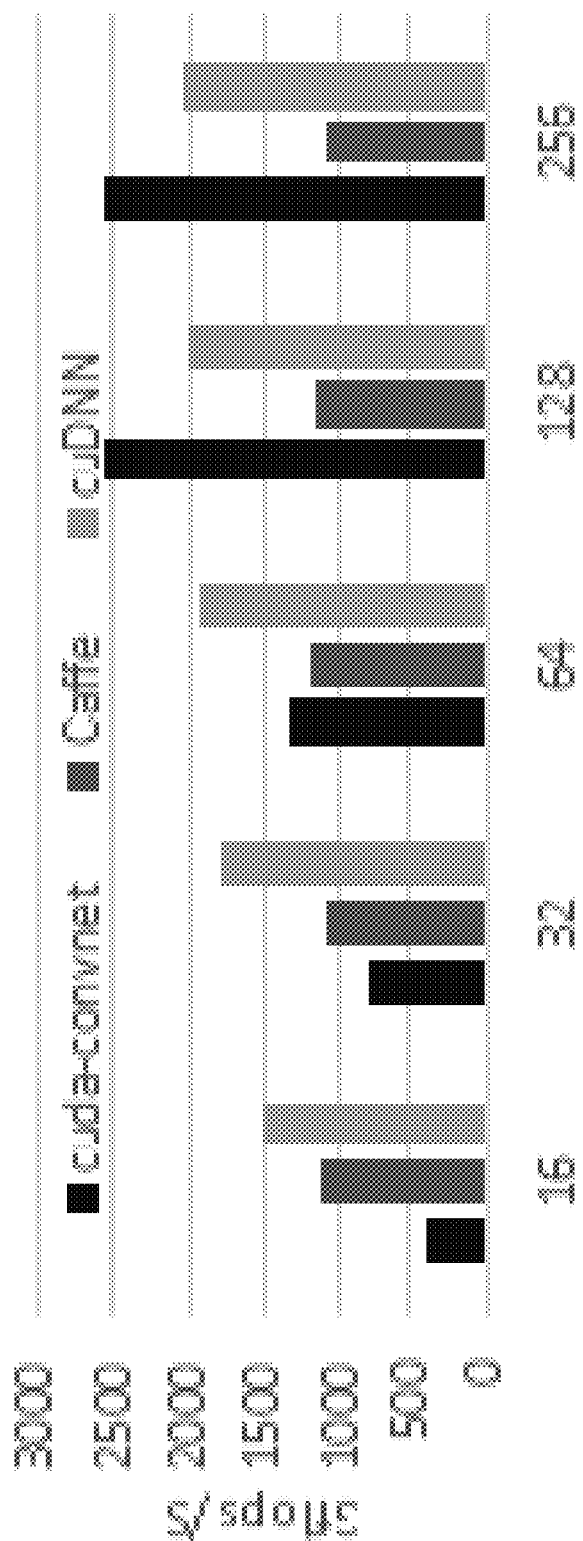
FIGS. 4(a) and 4(b) are graphs depicting a sensitivity study of data layouts on N and C dimensions for 4(a) the performances with different values of N, and 4(b) the performances with different values of C.
Figure 4B:
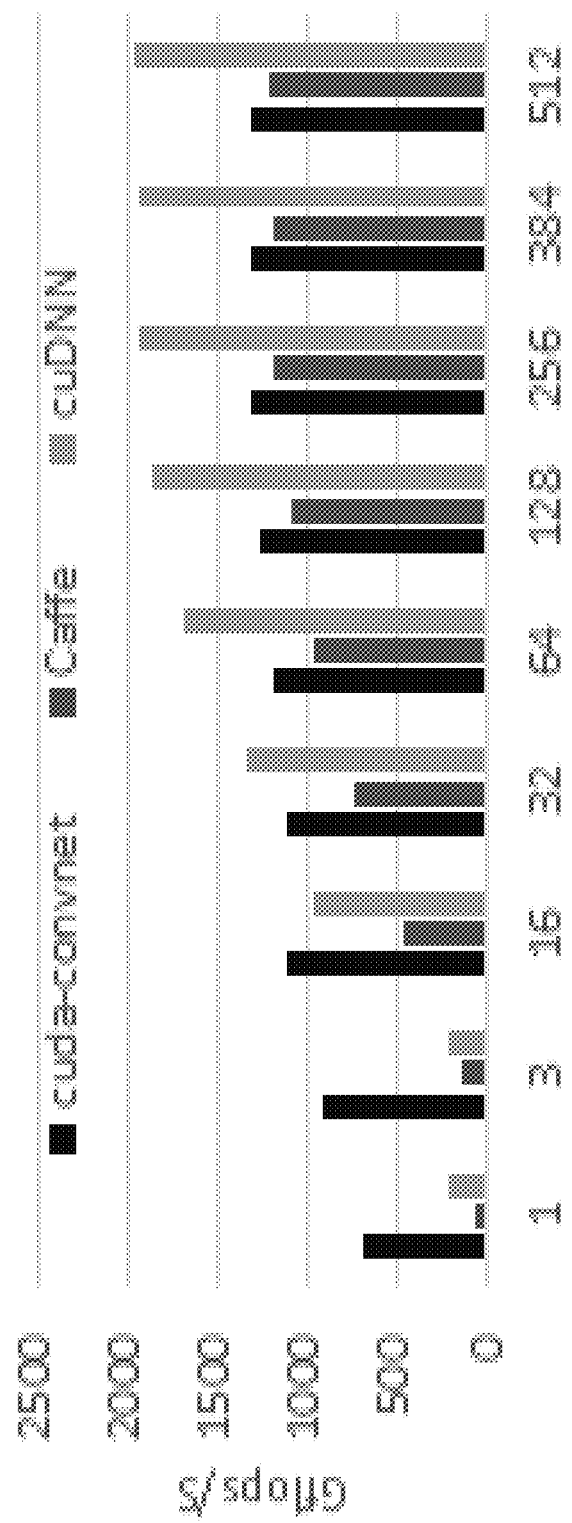

FIG. 4(a) shows the performance sensitivity when varying the value of N. From that Figure, we can observe that cuda-convnet with CHWN data layout is more sensitive as the value of N changes—as compared to Caffe or cuDNN. As shown in the Figure, cuda-convnet only outperforms Caffe and cuDNN when the number of images is more than 64. In cuda-convnet, the lowest dimension is the number of images, and cuda-convnet first allocates a warp with 32 threads in a thread block to process 32 images in SIMD model so that the memory accesses are coalesced. In order to further reduce off-chip memory accesses—if the number of images is 128—cuda-convnet let each thread to handle four images so that the data of these four images can be reused in the register file of the thread. If the number of images is less than 128, the reuse for images per thread must be less than four. As a result, the performance degrades quickly as the number of images is reduced. In other words, for the data layout, CHWN, the number of images has to be used for both memory coalescing and data reuse, and therefore cuda-convnet is very sensitive to the value of N Compared with cuda-convent, cuDNN and Caffe use the data layout NHCW, and develop the convolutional on top of matrix multiplication using Nvidia cuBLAS with the overhead of additional memory transformation. Since a matrix multiplication has only two dimensions, Caffe expands the input matrix, and merges multiple dimensions into two dimensions. The two-dimensional inputs require Nvidia cuBLAS less effort to optimize different data layouts as compared with four dimensions in convolutional layers. In other words, Caffe offloads data layout problems to Nvidia CUBLAS however, Caffe requires a memory transformation (i.e., memory expansion) to enable the matrix multiplication. As we know, for a square matrix multiplication, the ratio of computation to memory is linear to the size of any dimension of the input matrix. Therefore, reducing the size also reduces the ratio which means the overhead of copying the memory will be more significant. As a result, for the first few layers (e.g., CONV1, CONV5) when the value of C is less than 32, cuda-covnet still performs better and it doesn't have the overhead of memory expansion, We report the performance sensitivity of C on different data layout in FIG. 4(b).

With N fixed as 64, we vary C dimension with the commonly used value from 1, 3 to 512, cuDNN will perform better only when C is larger than 32. This is why for layers of CONV5 in Zeiler and CONV 9 in VGG with 3 as the value of C, even though N is smaller than 128, cuda-convnet still performs better.

With the behaviors of two common data layouts on different inputs now understood, we describe our heuristic approach to determine the data layout for a given input configuration. First, if the value of C is smaller than 32, CHWN will be selected as the cost of memory transformation used by Caffe and cuDNN is expensive. Second, if N has a large value (equal to or larger than 128), the CHWN data layout is still the better choice as the value of N is enough to achieve both memory coalescing and data reuse. For the rest input sizes, NCHW is a better choice due the limitation of CHWN.

Characterization of the Data Layout on Pooling Layers

Figure 5:
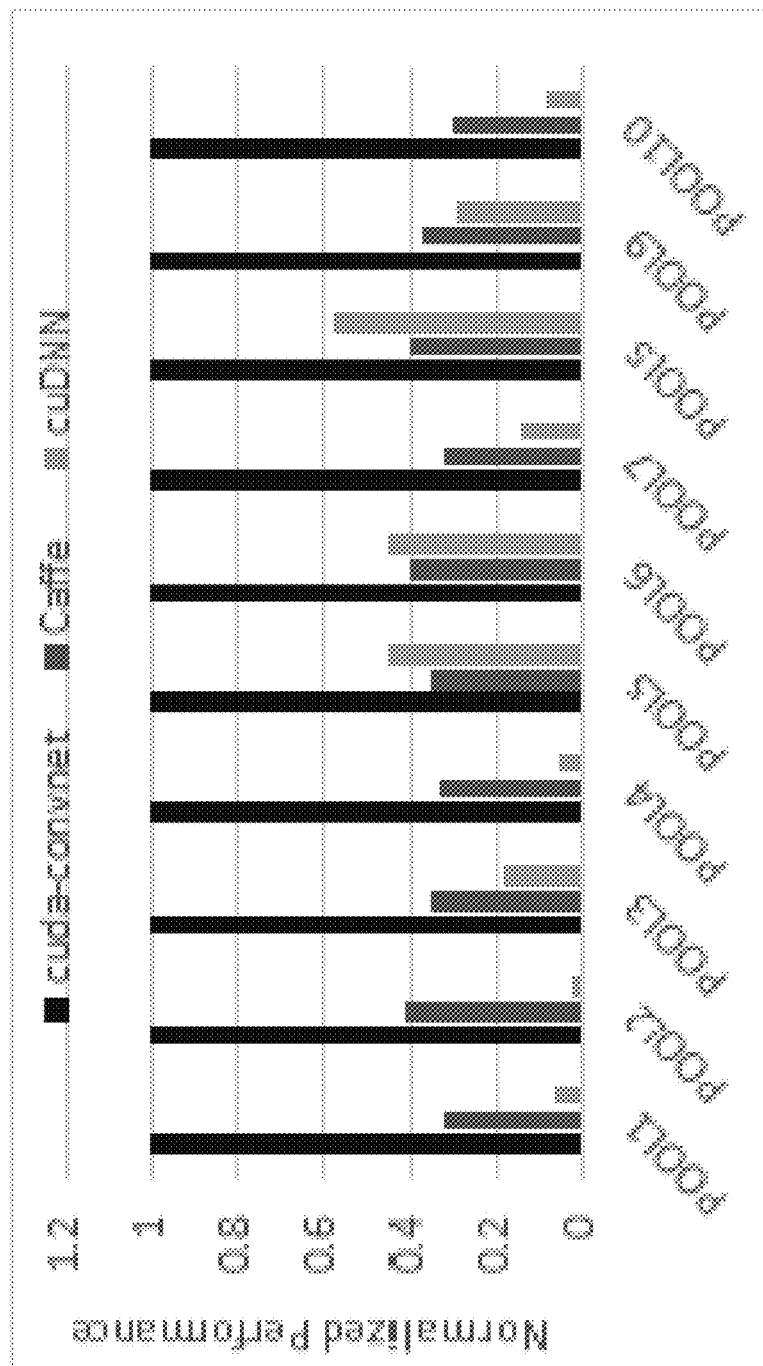
FIG. 5 is a graph showing the performance comparison of pooling layers with different data layouts in which the performance is normalized to cuda-covnet and the number on eacy layer denote(s) the highest bandwidth achieved.

FIG. 5 shows the performance comparison of pooling layers in different data layouts. As we can observe, cuda-convnet outperforms Caffe and cuDNN, with an average of 2.74 times and 6.75 times speedup compared to Caffe and cuDNN respectively. Although all pooling factors are the same, the (only) difference on data layouts leads to such a non-trivial effect. For cuda-convent, which uses CHWN data layout, a similar approach as the convolutional layer does is employed to achieve the memory coalescing along N dimension. However, for Caffe—which uses the NCHW data layout—the way of memory accesses is different. More particularly, as H and W dimensions are in the lowest dimensions, it means that the pooling operations directly apply on the pixels that are stored in memory consecutively (see Equation 2). To compute an output element, each thread in a thread block will access a pool window of input elements. The consecutive thread in a warp will thus perform the memory access with a stride. Such stride accesses (i.e. uniformed pattern) result in low memory efficiency without satisfying memory coalescing. Therefore, the memory accesses in CHWN is easier to be coalesced and more efficiency. A pooling layer with NCHW format can be transformed to CHWN to utilize the fast pooling processing. We note that Nvidia cuDNN adopts a somewhat similar strategy, but is more efficient by enabling on-chip memory expansion.

Characterization of the Data Layout on Softlayers

Figure 6:
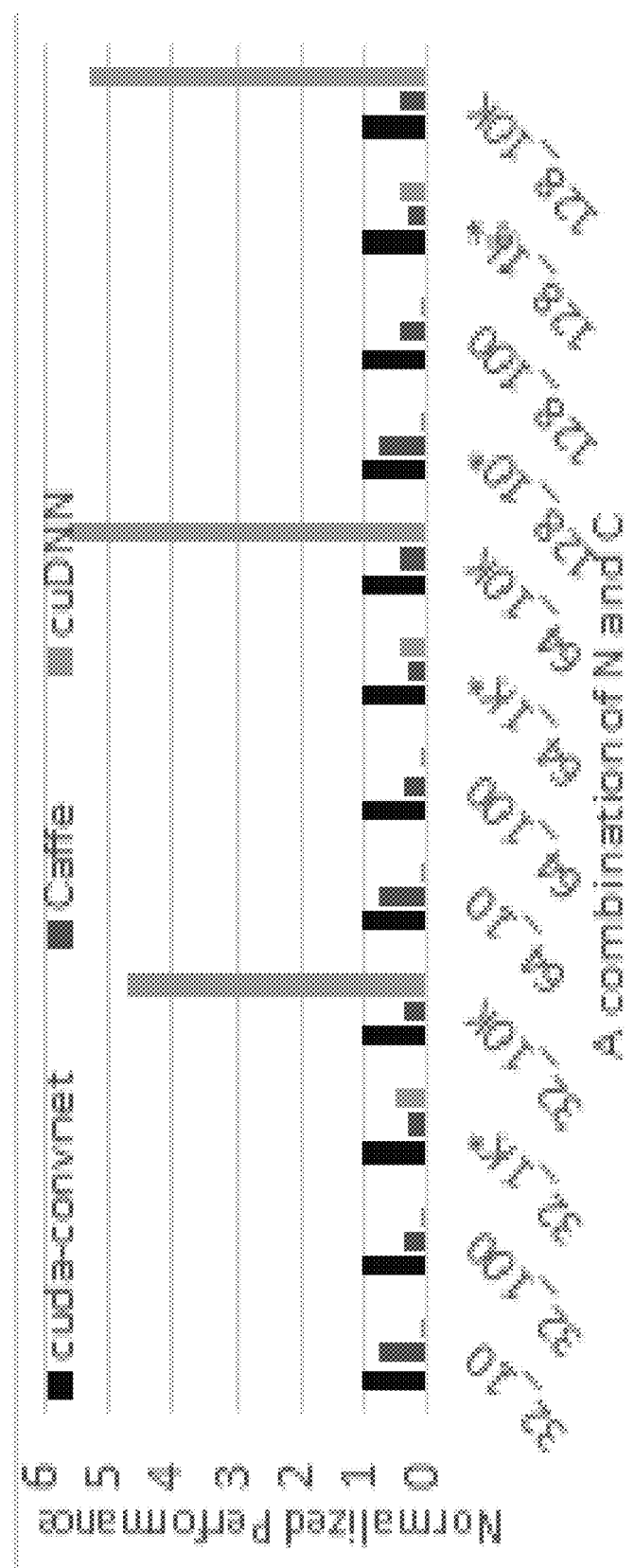
FIG. 6 is a graph depicting performance comparison of different frameworks on softmax layers wherein for each label, X_Y, in the x axis, X means the number of images or N for short, and Y means the number of categories or C and different kinds of common classification values are tested and performance is normalized to cuda-convnet according to an aspect of the present disclosure.

FIG. 6 shows the performance comparisons of different frameworks on softamax layers. The data in this layer only use two dimensional arrays. Caffe and cuDNN use the NC data layout, and cuda-convnet uses CN data layout. From the Figure we can see cuda-convnet performs better except when the value of C is 10 k. As shown in FIG. 1, the softmax layer contains two types of loops. One is along N dimension and another is along C dimension. Since the loops along N dimension have no loop-carried dependences, they are good candidates to be parallelized using multiple threads. As a result, if N is lowest dimension as cuda-convnet does, the parallelization on N dimension can meet the coalesced memory accesses and deliver better performance, while DNN and Caffe don't. We also observe cuDNN performs well when the value of C is 10 k. One possible reason for cuDNN is to explore the parallelism along C dimension from the underlying NC format. We will later describe how data layout impacts parallel strategy.

A Fast Data Layout Transformation
Implementation

In previous discussion, we have detailed the characteristics of the data layout and their impact which present substantial sensitivities among different types of layers and among different instances of a layer. More particularly, we note that a single data layout is not enough to achieve optimal performance for different inputs and different layers. With our newly acquired knowledge of a preferred data layout, a subsequent question arises namely, how to enable the desired data layout from the original one. To address this question, we design a fast data layout transformation library that supports the fast transformation between two different data layouts. Since NCHW and CHWN are two formats used in existing frameworks, the focus of our transformation is between these two formats. For brevity, we mainly discuss how to efficiently transform CHWN to NHWC as the transformation from NHWC to CHWN has a same memory access pattern with reversed input and output.

To implement a parallel transpose for a four dimensional array on GPUs, a simplistic method is to construct a four dimensional thread hierarchy wherein each thread dimension handles a dimension of the array as shown in FIG. 7(a). As may be observed from this Figure, the lowest dimension is handled by a thread having id, tx, and therefore it has to be moved to first dimension of the output array (see Line 5-6). One issue with this implementation is that memory accesses of the output array are not coalesced—as the threads in a warp have a long stride of C*H*W when accessing memory, causing serious bandwidth underutilization.

To eliminate the un-coalesced memory accesses and achieve best performance, we perform three steps as shown in FIG. 7(b). First, we observe that among two data layouts namely, NCHW and CHWN, three dimensions including C, H and W, have the same relative positions. Thus, we combine these three dimensions into a single dimension as CHW. Then NCHW is considered as [N][CHW], and CHWN is considered as [CHW][N] after combining. Therefore we downgrade the four dimensional transformation into two dimensional data layout transformation so that two dimensional thread hierarchy can handle it, as shown in Line(s) 4-5.

Second, to achieve the coalesced memory access for global writes, we first partition the two dimensional matrix into multiple small sub-blocks along two dimensions. The sub-block serves two purposes. First, memory accesses of each sub-block are coalesced through the effect of a shared memory array as shown in FIG. 7(b). Second, we use a thread block to handle a sub-block so that a set of thread blocks in a thread grid can finish all sub-blocks in parallel with balanced workload as shown in Lines 10-13.

Third—in Kepler architecture—the shared memory has two bank modes namely, 4-byte access and 8-byte access. Optimizing memory patterns to use the 8-bytes access mode can maximize the shared memory bandwidth by providing 256 bytes per cycle bandwidth as compared to 128 bytes—which reduces the data fetching time from shared memory. To do that, we vectorize our memory accesses by aggregating two consecutive float variables into a single word of float2 and the bank conflict is eliminated as a result of padding s shown in Lines 6-7. Correspondingly, the global load transactions will be doubled for data fetching, which brings us to another important benefit of increasing memory-level parallelism. To transpose data in a row of float2 elements into a column of fully discrete float elements, the memory access indices are adjusted so that two elements encapsulated in a float2 need to be mapped to two consecutive rows in the same colunm as shown in Lines 16-23. The overall kernel code with the three consecutive steps is shown in FIG. 7(b).

As may now be appreciated, since the input sizes may be different for different layers, the thread block configuration and kernel code have to be generated based on an input size to achieve the best performance. Our library we have constructed according to the present disclosure specially considers different values for N and C.

First, if N is a multiple of 64, we enable the vectorization as N is enough for coalesced memory accesses of 32 threads and allowing a float2 access for each thread. Second, threads along the X dimension in a thread block are allocated to process different pixels along the N dimension, and the number of threads along the X dimension is 32 in most cases. The only exception is when N is a multiple of 32 and C is 16 for which 16 is selected to eliminate intra-warp divergence in sub-block transpose. Third, if C is a multiple of 32, in a thread block we allocate 32 threads along Y dimension for different values of CHW. Otherwise if C is a multiple of 16, in a thread block we allocate 16 threads along the Y dimension for different values of CHW. The use of shared memory is based on the number of threads per thread block and whether or not float2 is used. Template is used to generate various entry points for different inputs.

Data Locality: Characterization and Optimization

In a CNN, the neurons in the feature channels are computed by constructing a neighboring window around the original neuron, and data sharing is existing among the localized computations in both the convolution and pooling layer. For the illustration purpose, we use the data layout, CHWN, and the pooling layer as the example.

Performance Characterization of Pooling Layers

In FIG. 5, we show the highest bandwidth achieved in each benchmarking layer in the three library/frameworks. As may be observed from that Figure, the bandwidth utilization is not high—especially for the overlapped layers (see * in Table 1) with a maximum of 173.9 GB/S and an average of 156.5 GB/S. For Caffe and cuDNN, the average bandwidth is 52.3 GB/s and 41.9 GB/s respectively while the peak bandwidth of a GTX Titan black is 288 GB/S. To understand why the memory utilization is so poor, we use FIG. 8(a) to show how this layer is implemented in cuda-convent and Caffe. The Figure shows an illustrative case wherein the input has 12 elements in a single dimension.

Figure 8:
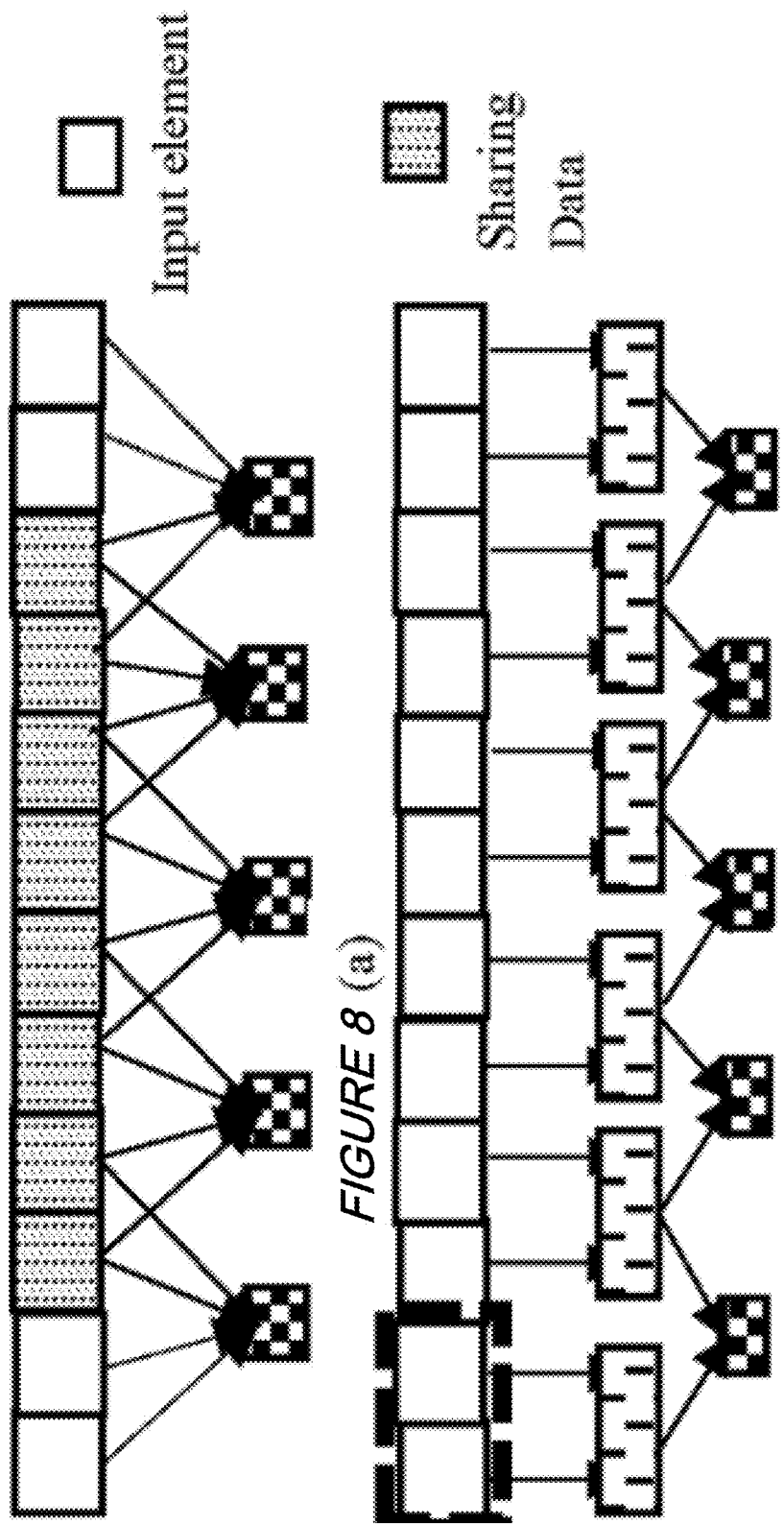
FIGS. 8(a) and 8(b) show schematic diagrams illustrating data locality in pooling (single dimension) according to an aspect of the present disclosure.

The stride is 2 and the size of window is 4 for this layer. Based on the algorithm, each output element needs to load 4 input elements and totally 20 global memory accesses are required. Among these 20 global memory accesses, there are a non-trivial number of redundant data accesses. For example, to compute the output element 1 and 2, we need the input elements 1 to 4 and 3 to 6, which leads to load two elements, 3 and 4, twice. In FIG. 8(a), we only show the data reuse along a single dimension. When the input is a 2D image, we can extend the data reuse to both X and Y dimensions.

Expanding the Working Set Per Thread

Figure 9:
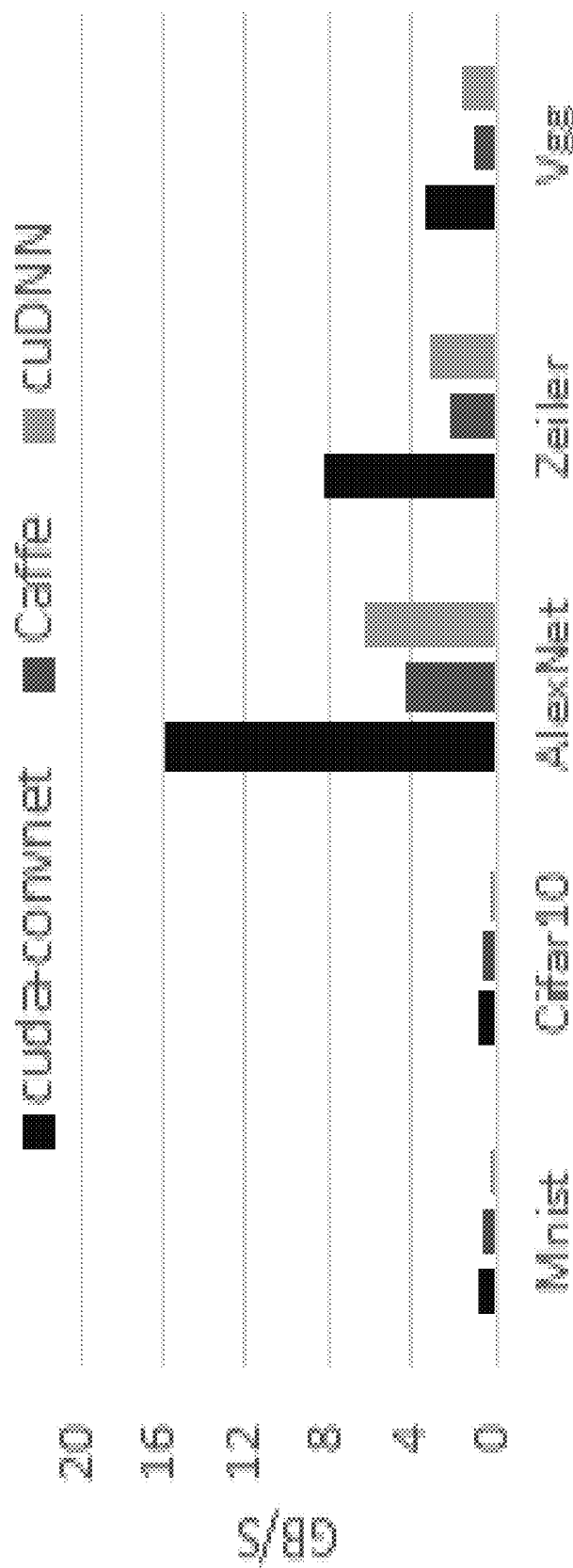
FIG. 9 is a graph showing performance achieved in softmax layers for representative networks according to an aspect of the present disclosure.

To remove redundant data accesses, on-chip memory resources may advantageously be exploited and data reuse migrated from off-chip global memory into on-chip memory blocks. According to an aspect of the present disclosure, we apply 3 steps to enable efficient utilization of on-chip memory resource(s) to exploit data reuse in the pooling layer. First, based on the stride, we partition the pooling window into segments whose size is the number of overlapped input elements of two neighbor output elements. As shown in FIG. 9(b), the number of overlapped elements is 2 and there are 2 segments having a size of 2 in each pooling window. When the window size is not divisible by the stride, the overlapped elements will be part of the segment. Second, the data reuse lies in the segments when computing consecutive output elements. Two on-chip memory resources—including shared memory and register file—is used to cache segments. The choice of using register file or shared memory correlates with the data layout.

In a CHWN data layout, a register file is preferred for at least two reasons. In addition to its lower latency, high access bandwidth and larger sizes as compared to shared memory, there is no data locality inside a thread block as the adjacent memory space in CHWN layout requires the two thread dimension in a thread block aligned on C and N order for memory coalescing (pooling works on H and W dimension). To enable the data sharing in register files, we expand the working set of each thread by computing multiple output elements instead of one. As shown in FIG. 9(b), five output elements have now been computed using a single thread instead of five threads. In this implementation, the register usage is increased—but not significantly. This is because when we finish the computation for an output element, we can write the value to the output array and free the register.

With the intermediate results in register block we need to aggregate a set of them to generate the final output elements. As shown in FIG. 9(b), to generate output element one, intermediate results from segment 1 and 2 need to be aggregated to compute output neuron 1. For output neuron 2, final results correlate with segment 2 and 3 for which segment 2 are reused through register file, and similarly in subsequent aggregating. The expansion of on-chip working set thus enable consecutive neurons to reuse intermediate results directly though low-latency, thread-level register tiling.

Expansion in 1D or 2D

As the pooling window is a two dimensional square, the overlap between successive pool windows can be along both X and Y dimensions. We can advantageously apply our approach on both dimensions. Of further advantage, segmentations may be reused by both X and Y dimensions. However, if both dimensions have been considered for data reuse, the particular method used to segment and any associated on-chip memory resources will be changed.

First, the working set will be expanded in each thread in two dimensions to achieve data reuse in a segment matrix. Correspondingly, the targeted elements inside a thread will process along two dimensions to generate 2D segmented matrixes. Also, the register blocks per thread will be allocated in 2-dimension to hold a matrix-type data, and—along each dimension—it will hold an intermediate result vector generated from one dimension of the segment matrix thread.

Since either type of expression (1D or 2D) may be optimal for a given problem input, it is a challenge to decide to use either 1D or 2D expansion. Additionally, it is difficult to decide the number of working sets to be expanded per thread. On one hand, a large working set expansion will enable more elements processed per thread, which in turn enables more data reuse through register tiling. However, the large on-chip working set residing in register file will "put pressure" to the register file, which potentially results in register spilling or limiting the number of threads per SMX. On the other hand, if the expansion is applied in a very small scale, the data reuse is also limited.

To determine optimal expand factor(s), a light-weight auto-tuning is applied by constructing a searching space for the working set expansion number. With different generations of GPUs, one optimal parameter in one GPU may become suboptimal in another. Accordingly, auto-tuning is used to tune out a best-performed code variant at a target device. Advantageously, our auto-tuning can find the optimal optimization for a given input on the target GPU used by developers.

To further manage the cost of auto-tuning, we apply an effective pruning strategy to reduce the search space. The auto-tuning first starts with an initialized expansion factor (2 in our experiments) on two modes: 1D expansion and 2D expansion. The number of expansion factor continues to increase, if the performance improves. The auto-tuning stops further searching otherwise. This uphill-climb strategy proves to be very effective (as evaluated herein) in the context of GPU execution because continually increasing the expansion factor imposes higher pressure on register file, which leads to either more high-cost register spilling or lower TLP, resulting in a worse performance.

Kernel Reconstruction: Characterization and Optimization
Performance Characterization of Softmax Layers For the softmax layer presented in FIG. 2, cuda-convnet and Caffe develop a kernel for each step and therefore there are five kernels. Between two consecutive kernels, the intermediate results are stored in the temporary global memory. Second, each step has two loops: one to cover all images and another is to cover all categories. Since the outer loop used to cover all images has no loop carried dependency, Caffe and cuda-convnet employ thread level parallelism for the outer loop by allocating one thread for each iteration of the loop. However, the inner loop is not parallelized, as the maximum or summation is performed for all iterations (i.e. loop carried dependence in inner loop). We show the effective bandwidth achieved for the softmax layers in FIG. 9. As shown in the figure, the best achieved bandwidth among existing implementations is less ⅒ of the peak bandwidth.

There are at least two reasons for this. First, intermediate results between two kernels are redundant and are not counted as the effective memory usage, while these global memory accesses are costly. Second, parallelism of the outer loop is not enough to utilize the massive thread level parallelism on GPUs. If the number of images is 128—which is very common in CNNs—the overall number of threads for each kernel is only 128, while a SMX needs at least 1024 threads to full utilization.

Kernel Fusion and Inner-Loop Parallelism

We observe all five steps have the same two-level loops, and the implementation employing five kernels also has the same thread block configuration after parallelizing the outer loop. Therefore, we can fuse these five kernels into a single kernel without modifying the thread block configuration. Further, since the output of a step is used as the input of its next step, the communication between two kernels becomes the inner-thread communication and the data used for the communication can be cached in register file or shared memory. After kernel fusion, the intermediate/temporary global memory accesses are eliminated to utilize the off-chip memory in a more efficient way.

The outer loops of five steps are the same without datathreads to perform the reduction along C dimension as the overall number of threads per thread block cannot exceed 1024. Therefore, the data layout, NC, can provide better TLP as the memory coalescing and data locality fall into the same dimension.

The code after our kernel fusion and inner-loop parallelism is shown in FIG. 10, and the data layout is CN. In the Figure, each thread block has 16 by 64 threads, and each thread along X dimension is used to handle each image. Therefore. 16 threads along X dimension accesses the off-chip memory in the coalesced manner. As implemented, 64 threads along Y dimension in a thread block are used to handle all categories of each image. The temporary results of each step are stored in the share memory and can be across steps in the same kernel. Note that our parallel pattern also ensures that bank conflict is freed across all outer and inner loops across steps including the tailing process (i.e. <32) of parallel reductions.

Experimental Results

We now show and describe performance improvements of data layout optimization, data locality optimization and inter-kernel optimization according to aspects of the present disclosure. We also describe overall performance impact of our optimizations on a whole network.

Performance Evaluation of Data Layout Optimizations

Since a single data layout and its implementation cannot always deliver best performance for different layer configurations, selecting a suitable data layout and enabling the data layout for a framework are two challenges. First, for all convolutional layers in table 1, our heuristics based on the value of N and the value of C can find the best layout between CHWN and NCHW. For layers including CONV1, CONV2, CONV3, and CONV4, CHWN is the best layout as the value of N is 128. For layers including CONV5 and CONV9, the number of input feature channels (i.e., C dimension) is less than 16, and therefore CHWN is still the best layout. For the rest layers, since the value of N is less than 128 and the value of C is more than 32, using NCHW as the data layout achieves the better performance. Therefore, all layers in Table 1 confirm the correctness of our heuristics and method(s) according to the present disclosure.

Figure 11:
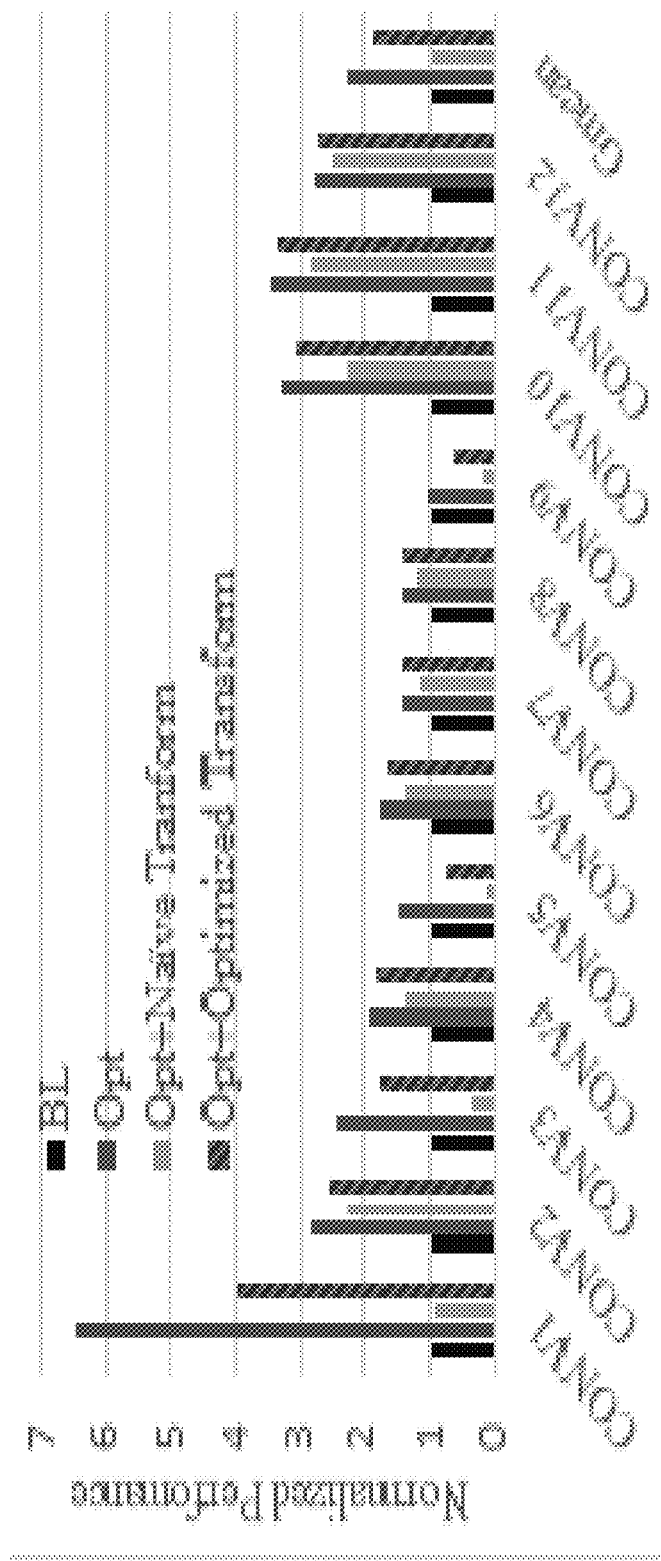
FIG. 11 is a graph showing performance comparison of various layers on four schemes: 1) less preferred data layout; 2) preferred data layout (i.e., Opt); 3) preferred data layout and naïve data layout transpose (i.e., Opt+Naïve Transform); and 4) preferred data layout and optimized transpose (i.e., Opt+Opt Transform) wherein performances are normalized to BL according to an aspect of the present disclosure.

Second, since a framework such as cuda-convnet has a fixed data layout, in order to take advantage of other data layouts, we have to transform the data layout. In FIG. 11, we show the performance using naive transformation and our optimized transformation. In this Figure, the baseline labeled "BL" is based on the data layout with the worse performance and the optimal one labeled as "Opt" is based on the data layout with the better performance. Also shown is the optimal performance with the overhead of a naive transformation and the optimal performance with the overhead of our optimization transformation.

As shown in the Figure, while the data layout can provide 6.46 times speedup for the layer, CONV1, the overhead of the transformation actually degrades the overall performance. Finally this layer achieves 4.02 times speedup using our fast transformation implementation. Notable exceptions are CONV3 and CONV9, whose performance difference is very small (only 4.75%) for different data layouts. Therefore even using an optimized transformation we cannot improve its performance. On average a better data layout can reduce the execution time by nearly 125% (2.25× speedup), while the data layout transformation overhead will eliminate the benefit and even degrade the overall execution time by an average of 1.7%. Using a correct layout and our fast transformation, we can deliver 1.84 times speedup.

Figure 12:
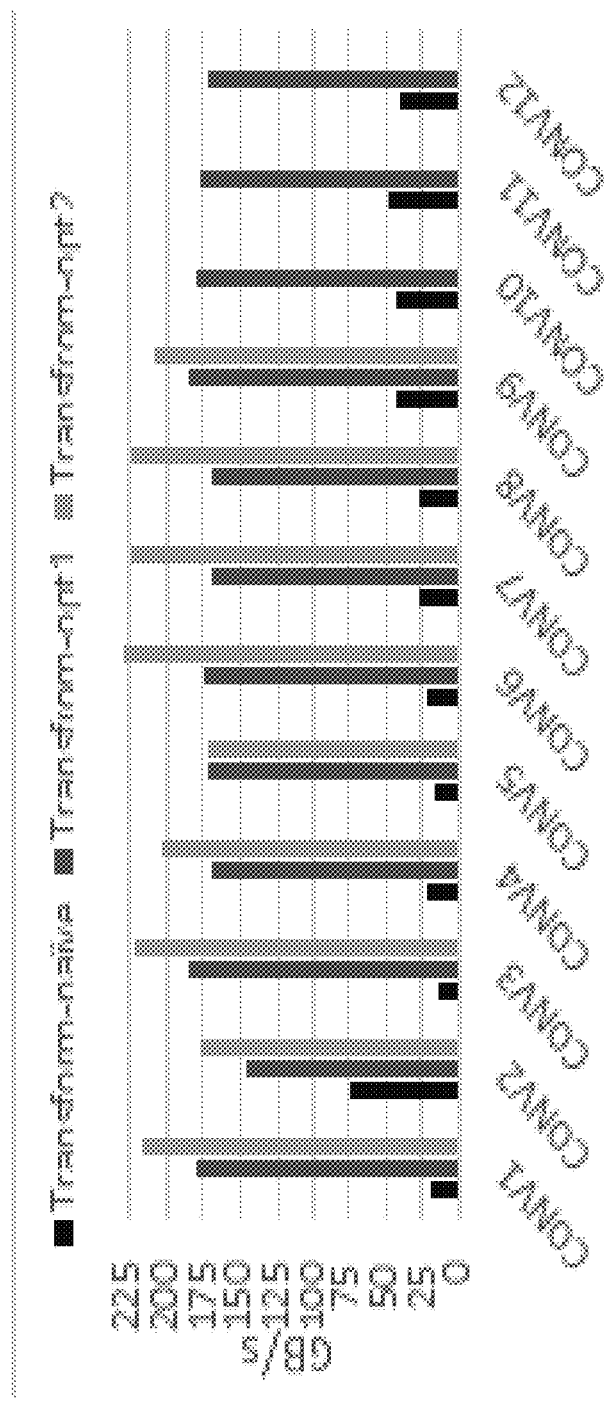
FIG. 12 is a graph showing memory bandwidth among three methods of data layout transformation wherein the transformation-opt2 (vectorization) is not available for layers for which the number of images is less than 64 according to an aspect of the present disclosure.

FIG. 12 shows the performance comparison between the naive transformation and our two optimized transformations namely, opt1 and opt2. For our optimized transformation, opt1—which is processed by layout flattening and applies the techniques of sub-blocking with shared memory transpose—it has significantly improved the performance with an average of 6.48 times speedup. By further applying the vectoring technique on the applicable layers (i.e. with at least 64-wide N), the bandwidth achieved by optimized transformation, opt2, has been improved up to 14.7 times, with an average speed up of 7.5 times speedup. The optimized bandwidth for CONV6 has achieved of 229.5 GB/s, which is 97.6% of the effective device bandwidth (i.e. 235 GB/s).

Figure 13:
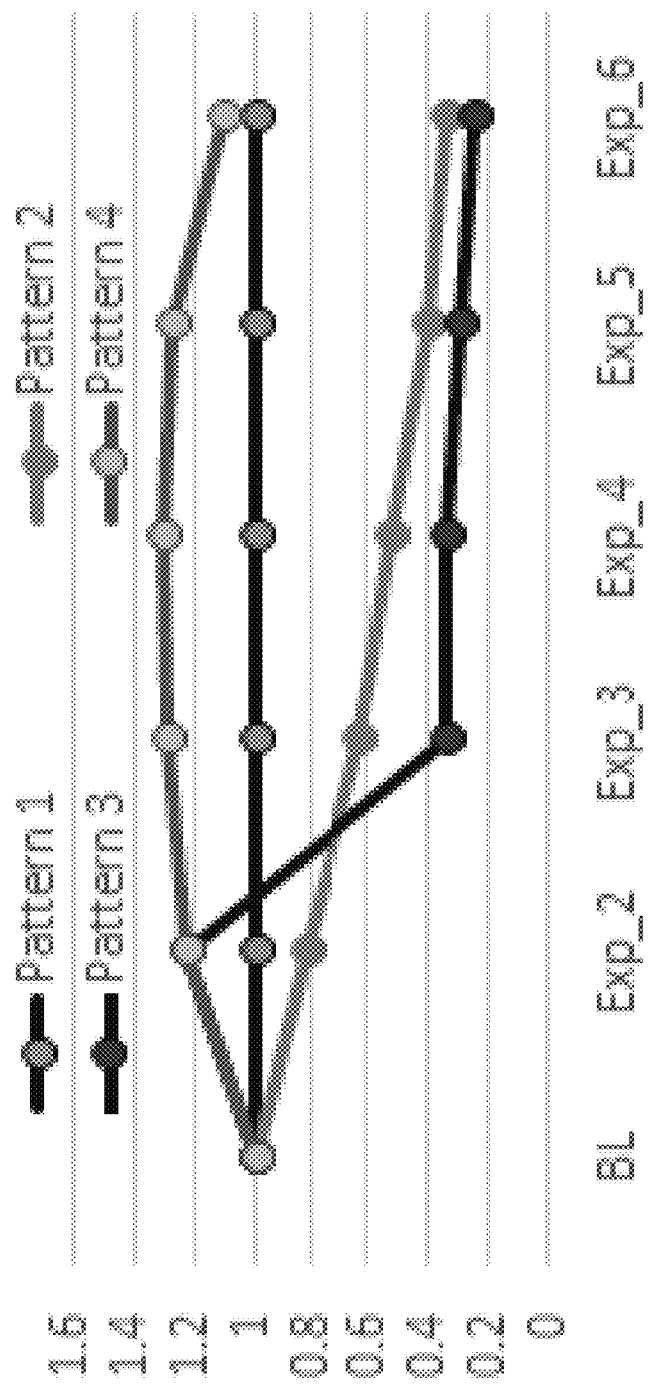
FIG. 13 is a graph showing performance patterns when expanding working set (using Exp_X) per thread on various pooling layers according to an aspect of the present disclosure.

We combine multiple output pixels in a thread to achieve better data locality for the pooling layer. The number of working set expansions per thread is an unknown parameter and can have a significant impact on performance. In FIG. 13, we show four different patterns when we increase the expansion factor (i.e., the number of output pixels) per thread. In this Figure, we use one line for each trend. The X axis is used for the expansion factor per thread and the Y axis is used for performance.

First, the pattern 1 shows the case that there is no overlap between windows and therefore increasing the number of output pixels per thread doesn't help the performance. POOL1 and POOL2 fall into this category. Second, for the pooling function that has overlapped pooling, the expansion of working set will stop if the performance begins to degrade, as shown in pattern 2, pattern 3 and pattern 4. For each of the three scenarios, their expansion factor will be different.

For pattern 2, any expansion will degrade the performance because the output feature size is already small enough and further expanding the work set per thread will reduce the available number of active threads which further reduce the hidden ability for long memory access latency. POOL4 and POOL10 have such a characteristic.

For pattern 3 and pattern 4, the expansion factor is 2 and 4 respectively. The best expansion factor is achieved in our auto-tuning with the balance between the available TLP and register tiling. For pattern 4, the amount of parallelisms from the pooling configuration is larger and more register tiling can be achieved without hurting the kernel's occupancy as compared to the layers of further increasing the expansion will degrade performance more.

Figure 14:
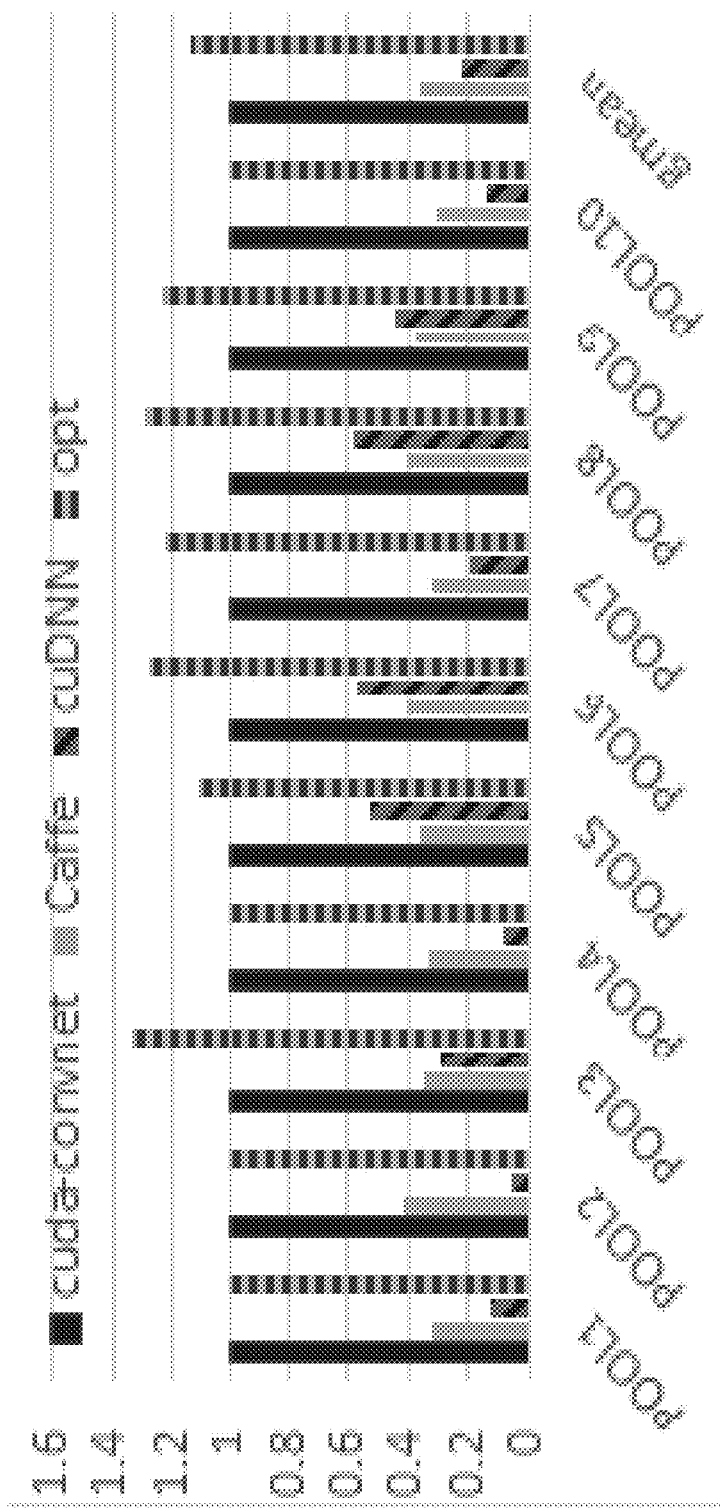
FIG. 14 is a graph showing performance comparison among four different implementations for pooling layers wherein the performance is normalized to cuda-covnet according to an aspect of the present disclosure.

FIG. 14 shows the performance comparison of various pool layers using different types of kernel implementations. As shown in the Figure, cuda-convnet outperforms the Caffe and cuDNN across the board. The preferred data layout in pooling layer is CHWN. For the layers that has overlapped pooling (i.e., stride is smaller than window size), our optimization on data locality labeled as "opt" in the Figure can be applied to achieve higher performance.

For example, in POOL3—whose pool window is 3—consecutive windows will overlap with 1 column and 1 row, the best performed kernel from data locality optimization improves the performance by 33.9%, with the bandwidth achieved at 203.4 GB/s. On average, our locality optimization achieves an average of 193.8 GB/s memory bandwidth and improves the state-of-art performance of 14.3% across different layer configurations.

Performance Evaluation of Inter-Kernel Optimizations on Softmax Layer

Figure 15:
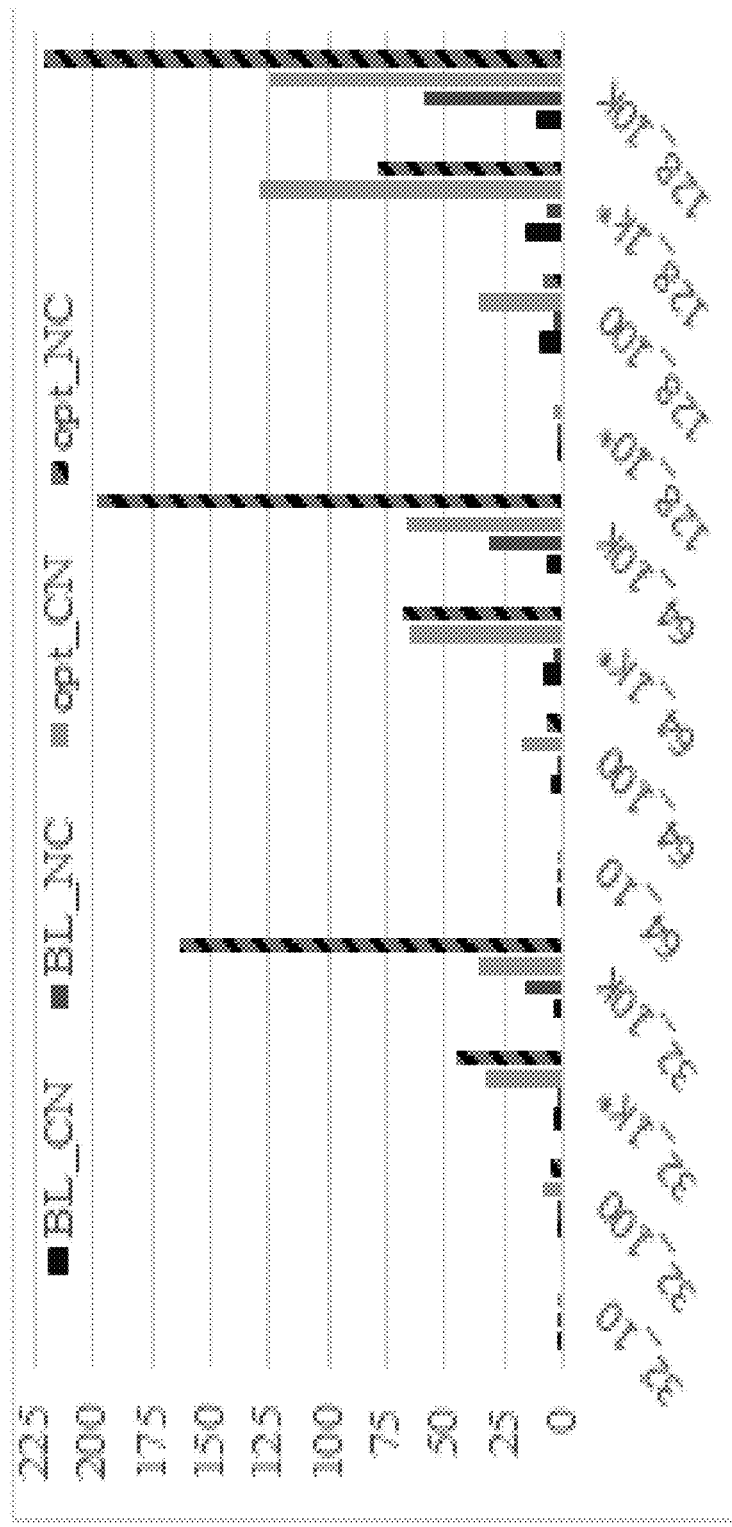
FIG. 15 is a graph showing performance comparison (GB/s) of softmax layers with a variety of configurations according to an aspect of the present disclosure.

FIG. 15 shows the memory bandwidth comparison between optimized kernel and original kernels for softmax layers. For each layer, four experimental results are reported. The bar, BL_CN denotes the bandwidth achieved using cuda-convent's softmax, which has the data layout CN (illustrated in FIG. 6). The bar, BL_NC, denotes the best performance that is achieved from Caffe and cuDNN, for whom the data layout NC. The bar—opt_NC—is the optimized version for data layout of NC and the bar, opt_CN is optimized for that of CN data layout.

As is shown in the Figure, when the size of dimension C is small, the implementation with data format of CN can outperform the implementation with data format of NC, no matter in the BL versions or our optimal versions. Furthermore, in either data format (i.e., CN or NC), our optimized version has consistently improved the memory bandwidth across all kinds of layers significantly. For example, when the layer has a large number of categories (such as 10000 in layer 12), the bandwidth achieved in opt_NC can reach 220.95 GB/s, which is 94.02% of the effective device bandwidth compared to the BL implementation, for which the highest bandwidth is achieved at 58.30 GB/s by cuDNN. This significant performance improvement demonstrates that data sharing is critical on performance optimization especially on multiple kernel data sharing, and effective optimization on improvement data sharing can greatly enhance the overall module (e.g., softmax) performance.

Figure 16:
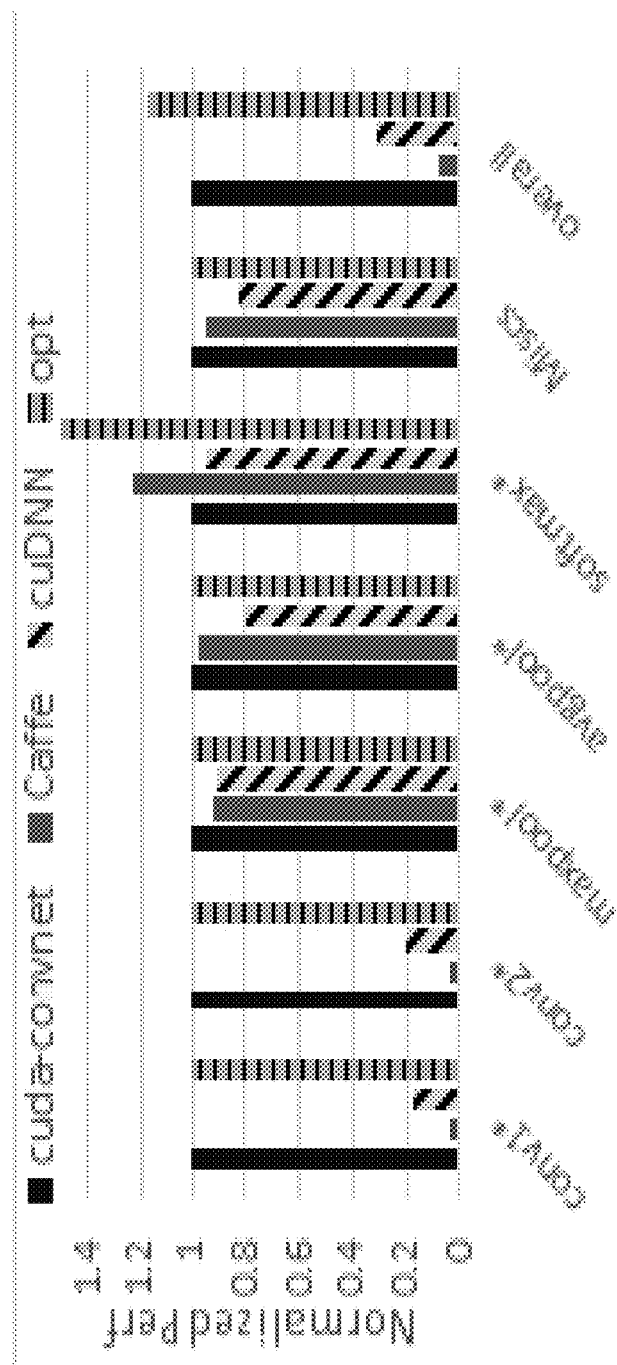
FIG. 16 is a graph showing overall performance comparison on MNIST network—normalized to cuda-covnet according to an aspect of the present disclosure.

FIG. 16 shows the performance comparison for different implementations on the whole MNIST networks. The network contains 2 convolution networks, two pooling layers, 1 softmax layers, and other layers such as log reg and full-connect layers. As compared to Caffe or cuDNN, due to a better data layout CHWN, cuda-convnet outperforms them significantly in convolution layer. The overall performance speedup is 13.3× and 3.3× over Caffe and cuDNN. Our optimizations on data layout will achieve the same (Only applying kernel fusion increase performance when C is small but performs significantly bad, even much worse than baseline. Inner-loop parallelism Injection techniques significantly improve the performance across the board from 2.13× to 960.91× on very large C) performance on convolution layers as cuda-convnet, and in softmax layer, our performance achieves up 15.7× speedup, which translates into 17.4% performance improvement over cuda-convnet.

Figure 17:
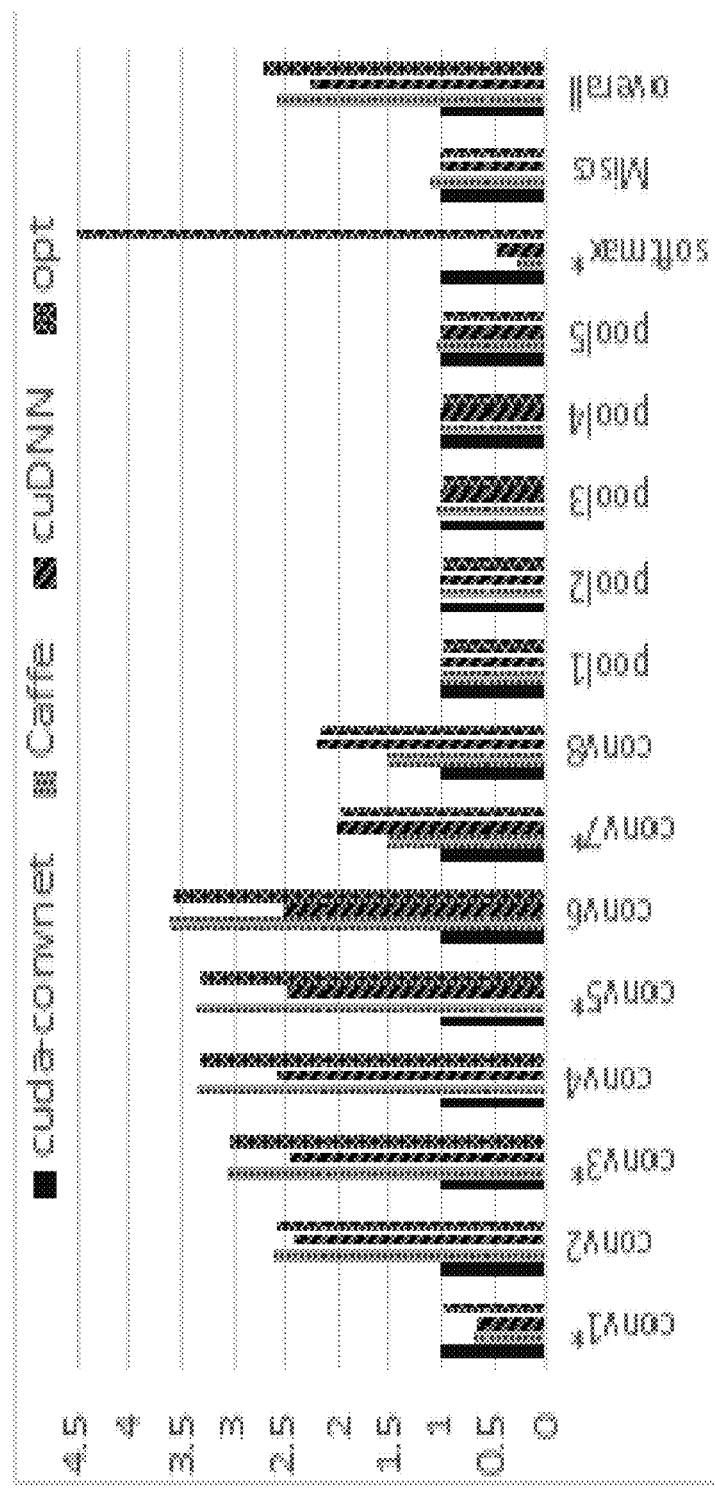
FIG. 17 is a graph showing overall performance comparison on VGG network normalized to cuda-covnet according to an aspect of the present disclosure.

FIG. 17 shows the performance on the very large data network VGG, which has a very deep layer hierarchy. It has 8 convolution layers, 5 pooling layers, 1 softmax and other layers including droupout, log reg and fully-connect layers. Only the first convolution layer favors the data layout in cuda-convnet, and the other 7 convolution layers favor the data layout in Caffe or cuDNN. As each convolution layer is heavily time-consuming, Caffe and cuDNN outperforms the cuda-convnet with a speedup of 2.56× and 2.23×. Our optimizations on convolution layer select the best data layout for each convolution layer (i.e. the first conv layer uses CHWN, the 2nd and later convolutional layers use NCHW), and on softmax layer our optimization improves the performance with a speedup of 12.96× over the best of the three implementations. These optimizations lead a 2.73× speedup over cuda-convnet.

At this point, while we have presented this disclosure using some specific examples, those skilled in the art will recognize that our teachings are not so limited. Accordingly, this disclosure should be only limited by the scope of the claims attached hereto.

The invention claimed is:

1. A method for improving memory efficiency of a convolutional neural network (CNN) operating on a graphics processing unit (GPU), the method comprising computer implemented steps of:
    generating a layout transformation for data operated on by a convolutional layer of the CNN, wherein the data is organized as four dimensional arrays by:
        degrading the four dimensional arrays into two dimensional arrays by selectively combining dimensions;
        partitioning each two dimensional array into multiple sub-blocks along two-dimensions, and applying a transformation on each sub-block; and
        optimizing memory patterns to use 8-byte access mode(s) such that a shared memory bandwidth is maximized by providing 256 byte per cycle bandwidth by aggregating two consecutive float type variables into a single word of float type.

* * * * *